C. W. SALADEE.

Improvement in Barrel Heads.

No. 125,694.  Patented April 16, 1872.

125,694

UNITED STATES PATENT OFFICE.

CYRUS W. SALADEE, OF ST. CATHARINES, CANADA, ASSIGNOR TO HIMSELF AND L. DOBBINS, OF ERIE, PENNSYLVANIA.

IMPROVEMENT IN BARREL-HEADS.

Specification forming part of Letters Patent No. 125,694, dated April 16, 1872.

SPECIFICATION.

Be it known that I, CYRUS W. SALADEE, of St. Catharines, in the Dominion of Canada, have invented certain Improvements in Barrel-Heads, of which the following is a specification embodying my invention, reference being had to the accompanying drawing and to the letters of reference marked thereon.

The nature of my invention consists in making one of the heads of a barrel of a thick stave or center piece across the center of the end of sufficient width and thickness to admit of cutting out of its center portion a round or circular piece to serve as a movable head, being so cut, sawed, or turned out as to present corresponding beveled edges, and in such manner that the piece so taken out shall closely fit back again into the hole from which it was taken, and there to be firmly held by two or more cross-bars in combination with a set-screw or other equivalent fastening, that shall draw the movable head down into its place sufficiently close to make a perfectly water-tight joint, and so that it may be removed and replaced at will.

The object of my invention is to enable me to remove a part of the barrel-head for the purpose of inspecting the contents of fish or pork barrels without disturbing the hoops of the same, and thus prevent the loss of brine consequent upon the present method of removing the head for that and similar purposes.

Figure 1:
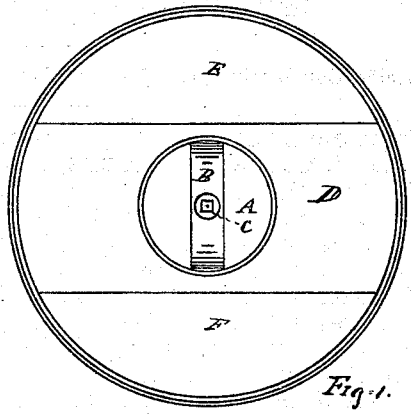
Figure 2:
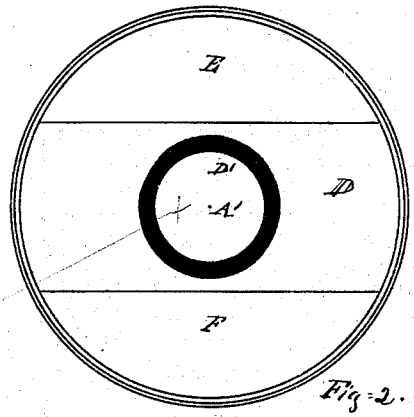
Figure 4:
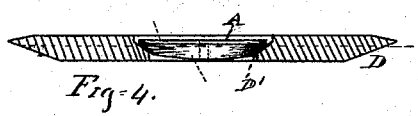
Figure 3:
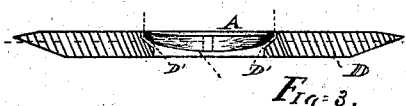
Figure 5:
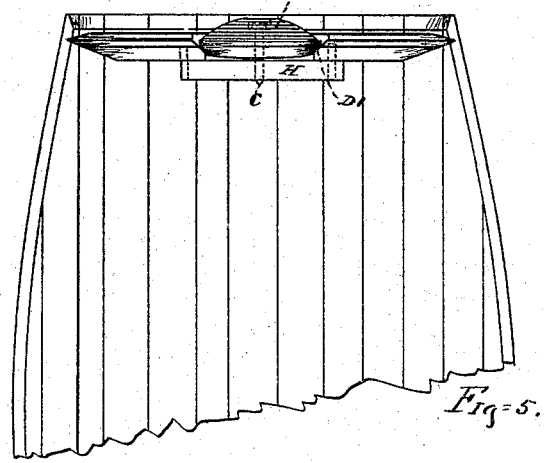
Figure 6:
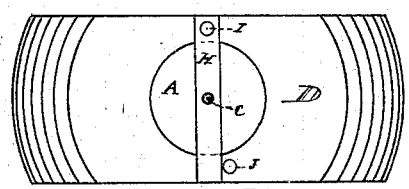

In the drawing, Figure 1 is a top view of my improved barrel-head A in position. Fig. 2 is a top view of my improved barrel-head with the movable head A removed, and showing the opening through the center stave D and the flange D', on which the movable head rests when in position. Fig. 3 is an edge view of the center stave D in section, and showing how the movable head A is cut out of it. Fig. 4 is the same view as Fig. 3, showing the movable head A resting upon the flange D', formed by cutting out the head A from the center stave D. Fig. 5 is a cross-section of part of a barrel, showing my complete barrel-head in position. Fig. 6 is a bottom view of the center stave D, showing the cross-bar H, which receives the lower end of the set-screw C, and by which the movable head A is firmly held in position.

I produce my improved barrel-head substantially as follows, to wit: The head of the barrel is made of three or more pieces, having the center stave D made of lumber about one inch thick, while the adjoining side staves or pieces E and F may be made any thickness requisite. The center stave D is made sufficiently wide to admit of cutting through its central portion the diameter of hole which I may determine to have. This hole A' (see Fig. 2) is so cut, sawed, or turned out that the circular piece A taken therefrom shall have the required bevel D' or other equivalent form upon the edge that will exactly fit back into the hole from which it was taken, as clearly shown in the drawing. On the top of the movable head A, at right angles with the grain in the wood of the main head of the barrel, I secure the cross-brace B, seen in Figs. 1 and 5, and in the top of which is made a countersink, through which and the head A is made the hole receiving the set-screw c. On the under side of the center stave D (see Fig. 6) is pivoted the cross-bar H to the pin I, while a stud, J, is set in position, as shown, to serve as a "stop" for that end of the bar H centered across the hole. A side view of this bar H is seen in Fig. 5, and where the lower end of the set-screw C is shown to find its thread in the bar H.

Should it be found requisite the more effectually to prevent leakage, I may interpose a suitable elastic substance between the bearing of the movable head A when in position, but experience has demonstrated that in all cases where the movable head A has been cut out by suitable machinery that will execute its work accurately, no joint in the barrel is more closely fitting than is the one made by the movable head, when firmly held in position by the set-screw C or other equivalent fastening.

I will here state that, in all cases where it might be found desirable to use a movable head other than the one cut out of the hole A', one of glass or metal, or other suitable material, may be substituted therefor.

I claim as my invention—

The combination of the cross-brace B, cross-bar H, movable head A, and set-screw C or their equivalents, substantially as and for the purpose set forth.

CYRUS W. SALADEE.

Witnesses:
  E. A. SALADEE,
  JOHN MURRAY.